(12) United States Patent
Zhou et al.

(10) Patent No.: US 12,476,769 B2
(45) Date of Patent: Nov. 18, 2025

(54) TRANSMISSION CONFIGURATION INDICATOR STATES IN DOWNLINK CONTROL INFORMATION FORMAT 1_2

(71) Applicant: QUALCOMM Incorporated, San Diego, CA (US)

(72) Inventors: Yan Zhou, San Diego, CA (US); Fang Yuan, Beijing (CN); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 388 days.

(21) Appl. No.: 18/005,279

(22) PCT Filed: Sep. 14, 2021

(86) PCT No.: PCT/US2021/071447
§ 371 (c)(1),
(2) Date: Jan. 12, 2023

(87) PCT Pub. No.: WO2022/061333
PCT Pub. Date: Mar. 24, 2022

(65) Prior Publication Data
US 2023/0254097 A1    Aug. 10, 2023

(30) Foreign Application Priority Data
Sep. 15, 2020  (WO) ................ PCT/CN2020/115271

(51) Int. Cl.
*H04L 5/00* (2006.01)
*H04W 72/1273* (2023.01)
*H04W 72/232* (2023.01)

(52) U.S. Cl.
CPC ....... *H04L 5/0094* (2013.01); *H04W 72/1273* (2013.01); *H04W 72/232* (2023.01)

(58) Field of Classification Search
CPC ............ H04W 72/1273; H04W 72/232; H04L 5/0094
USPC ......................................................... 370/329
See application file for complete search history.

(56) References Cited

U.S. PATENT DOCUMENTS

| | | | |
|---|---|---|---|
| 2019/0115955 A1 | 4/2019 | John Wilson et al. | |
| 2020/0015200 A1 | 1/2020 | Vilaipornsawai et al. | |
| 2020/0045700 A1 | 2/2020 | Sun et al. | |
| 2020/0267750 A1 | 8/2020 | Park et al. | |
| 2021/0143964 A1* | 5/2021 | Frenne ................ | H04L 5/0035 |

(Continued)

OTHER PUBLICATIONS

International Search Report and Written Opinion—PCT/CN2020/115271—ISA/EPO—Jun. 16, 2021.

(Continued)

*Primary Examiner* — Peter G Solinsky
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, downlink control information (DCI) in format 1_2 that includes an indicator with a first quantity of codepoints that is smaller than a second quantity of activated transmission configuration indicator (TCI) states. Accordingly, the UE may apply a TCI state, from the first quantity of activated TCI states out of the second quantity of activated TCI states, according to the indicator. Numerous other aspects are described.

30 Claims, 8 Drawing Sheets

(56) References Cited

U.S. PATENT DOCUMENTS

2021/0399840 A1* 12/2021 Yi .................... H04W 72/23
2021/0410132 A1* 12/2021 Xu .................... H04B 7/0695

OTHER PUBLICATIONS

International Search Report and Written Opinion—PCT/US2021/071447—ISA/EPO—Dec. 21, 2021.
Mediatek Inc: "Futher Details on Beam Management", Ha, 3GPP TSG RAN WG1 Meeting #91, R1-1719565, Reno, U.S., Nov. 27-Dec. 1, 2017, 9 Pages, XP051369379, Retrieved from the Internet: URL: http://www.3gpp.org/ftp/tsg%5Fran/WG1%5FRL1/TSGR1%5F91/Docs/. [Retrieved on Nov. 18, 2017], see 2.1, 2.2, 2.3, the whole document.
Moderator (Samsung): "Summary of e-mail Discussion on the LS for Remaining eMIMO Issues", 3GPP TSG RAN WG1 Meeting #102-e, 3GPP Draft, R1-2007202, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 25, 2020 (Aug. 25, 2020), XP051921463, p. 1.
Samsung: "Summary of Proposed Corrections (AI 6.16.3) (Phase 2)", VERYU 3GPP TSG-RAN2 Meeting #, 3GPP Draft, R2-2005796, 3rd Generation Partnership Project (3GPP), Mobile Competence Centre, 650, Route Des Lucioles, F-06921 Sophia-Antipolis Cedex, France, vol. RAN WG2, No. Electronic, Jun. 1, 2020-Jun. 12, 2020, 15 Pages, Jun. 5, 2020 (Jun. 5, 2020), XP051897928, p. 8.
ZTE [RAN1]: "Draft Reply LS on Detail MIMO MAC CE Operations", 3GPP TSG RAN WG1 #102-e, 3GPP Draft, R1-2005492, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, 2 Pages, Aug. 2020 (Aug. 8, 2020), XP051917505, p. 1.

* cited by examiner

TRANSMISSION CONFIGURATION INDICATOR STATES IN DOWNLINK CONTROL INFORMATION FORMAT 1_2

CROSS-REFERENCE TO RELATED APPLICATIONS

This Patent Application is a 371 national stage of PCT Application No. PCT/US2021/071447 filed on Sep. 14, 2021, entitled "TRANSMISSION CONFIGURATION INDICATOR STATES IN DOWNLINK CONTROL INFORMATION FORMAT 1_2," which claims priority to Patent Cooperation Treaty (PCT) Application No. PCT/CN2020/115271, filed on Sep. 15, 2020, entitled "DETERMINING SIZE FOR DOWNLINK CONTROL INFOMRATION. The disclosure of the prior Applications are considered part of and are hereby expressly incorporated by reference into this Patent Application.

FIELD OF THE DISCLOSURE

Aspects of the present disclosure generally relate to wireless communication and to techniques and apparatuses for indicating transmission configuration indicator states in downlink control information format 1_2.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a user equipment (UE). The apparatus may include a memory and one or more processors coupled to the memory. The one or more processors may be configured to receive, from a base station, downlink control information (DCI) in format 1_2 that includes an indicator with a first quantity of codepoints that is smaller than a second quantity of activated transmission configuration indicator (TCI) states, the first quantity of codepoints relating to a subset of the second quantity of activated TCI states, the subset comprising a first quantity of activated TCI states. The one or more processors may be further configured to apply a TCI state, from the subset, according to the indicator.

Some aspects described herein relate to an apparatus for wireless communication at a base station. The apparatus may include a memory and one or more processors coupled to the memory. The one or more processors may be configured to transmit DCI in format 1_2 that includes an indicator with a first quantity of codepoints that is smaller than a second quantity of activated TCI states, the first quantity of codepoints relating to a subset of the second quantity of activated TCI states, the subset comprising a first quantity of activated TCI states. The one or more processors may be further configured to apply a TCI state, from the subset, according to the indicator.

Some aspects described herein relate to a method of wireless communication performed by a UE. The method may include receiving, from a base station, DCI in format 1_2 that includes an indicator with a first quantity of codepoints that is smaller than a second quantity of activated TCI states, the first quantity of codepoints relating to a subset of the second quantity of activated TCI states, the subset comprising a first quantity of activated TCI states. The method may further include applying a TCI state, from the subset, according to the indicator.

Some aspects described herein relate to a method of wireless communication performed by a base station. The method may include transmitting DCI in format 1_2 that includes an indicator with a first quantity of codepoints that is smaller than a second quantity of activated TCI states, the first quantity of codepoints relating to a subset of the second quantity of activated TCI states, the subset comprising a first quantity of activated TCI states. The method may further include applying a TCI state, from the subset, according to the indicator.

Some aspects described herein relate to a non-transitory computer-readable medium that stores a set of instructions for wireless communication by a UE. The set of instructions, when executed by one or more processors of the UE, may cause the UE to receive, from a base station, DCI in format 1_2 that includes an indicator with a first quantity of codepoints that is smaller than a second quantity of activated TCI states, the first quantity of codepoints relating to a subset of the second quantity of activated TCI states, the subset comprising a first quantity of activated TCI states. The set of instructions, when executed by one or more processors of the UE, may further cause the UE to apply a TCI state, from the subset, according to the indicator.

Some aspects described herein relate to a non-transitory computer-readable medium that stores a set of instructions for wireless communication by a base station. The set of instructions, when executed by one or more processors of the base station, may cause the base station to transmit DCI in format 1_2 that includes an indicator with a first quantity of codepoints that is smaller than a second quantity of activated TCI states, the first quantity of codepoints relating to a subset of the second quantity of activated TCI states, the subset comprising a first quantity of activated TCI states. The set of instructions, when executed by one or more processors of the base station, may further cause the base station to apply a TCI state, from the subset, according to the indicator.

Some aspects described herein relate to an apparatus for wireless communication. The apparatus may include means for receiving, from a base station, DCI in format 1_2 that includes an indicator with a first quantity of codepoints that is smaller than a second quantity of activated TCI states, the first quantity of codepoints relating to a subset of the second quantity of activated TCI states, the subset comprising a first quantity of activated TCI states. The apparatus may further include means for applying a TCI state, from the subset, according to the indicator.

Some aspects described herein relate to an apparatus for wireless communication. The apparatus may include means for transmitting DCI in format 1_2 that includes an indicator with a first quantity of codepoints that is smaller than a second quantity of activated TCI states, the first quantity of codepoints relating to a subset of the second quantity of activated TCI states, the subset comprising a first quantity of activated TCI states. The apparatus may further include means for applying a TCI state, from the subset, according to the indicator.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
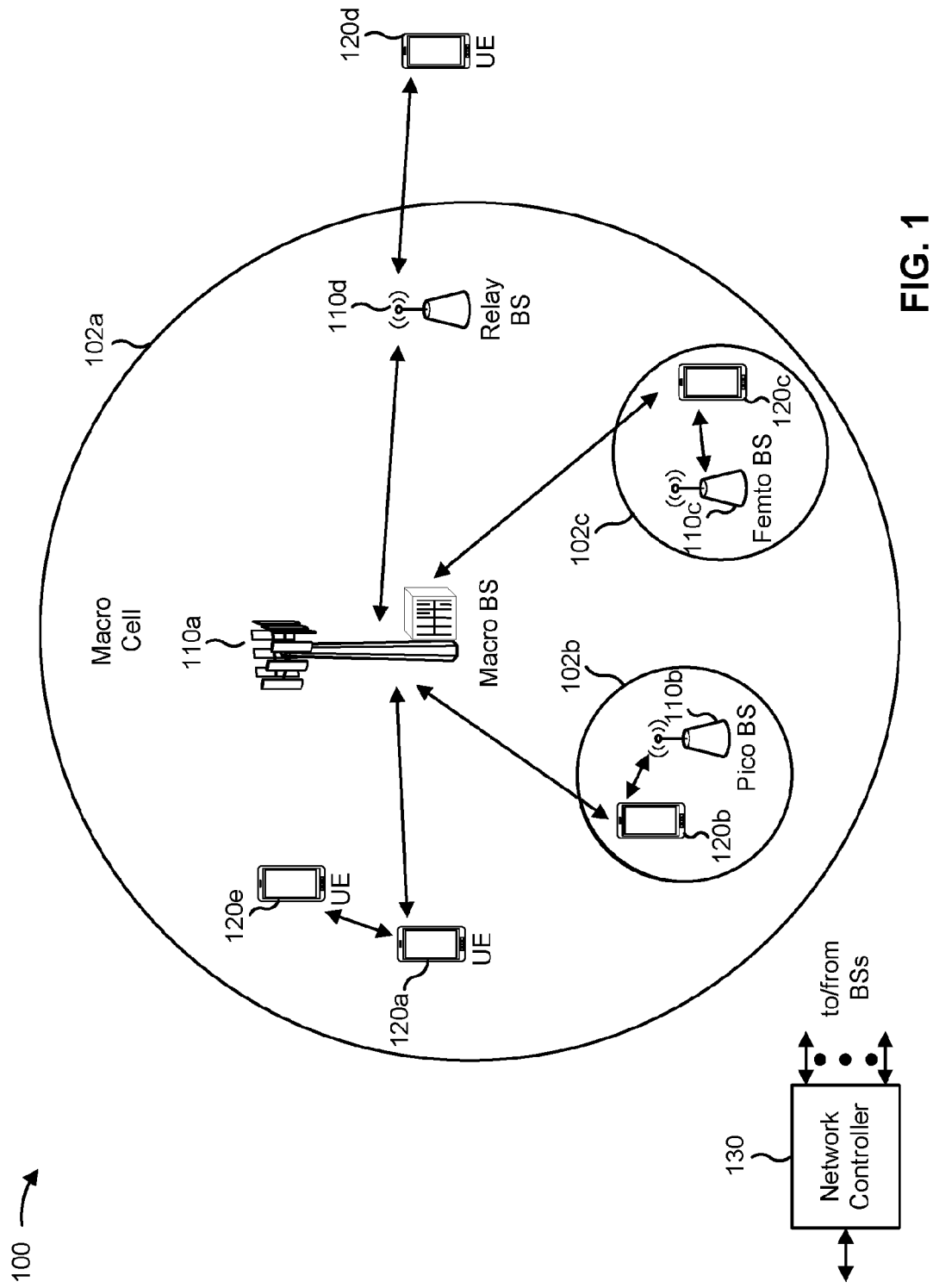
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120$a$ and UE 120$e$) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
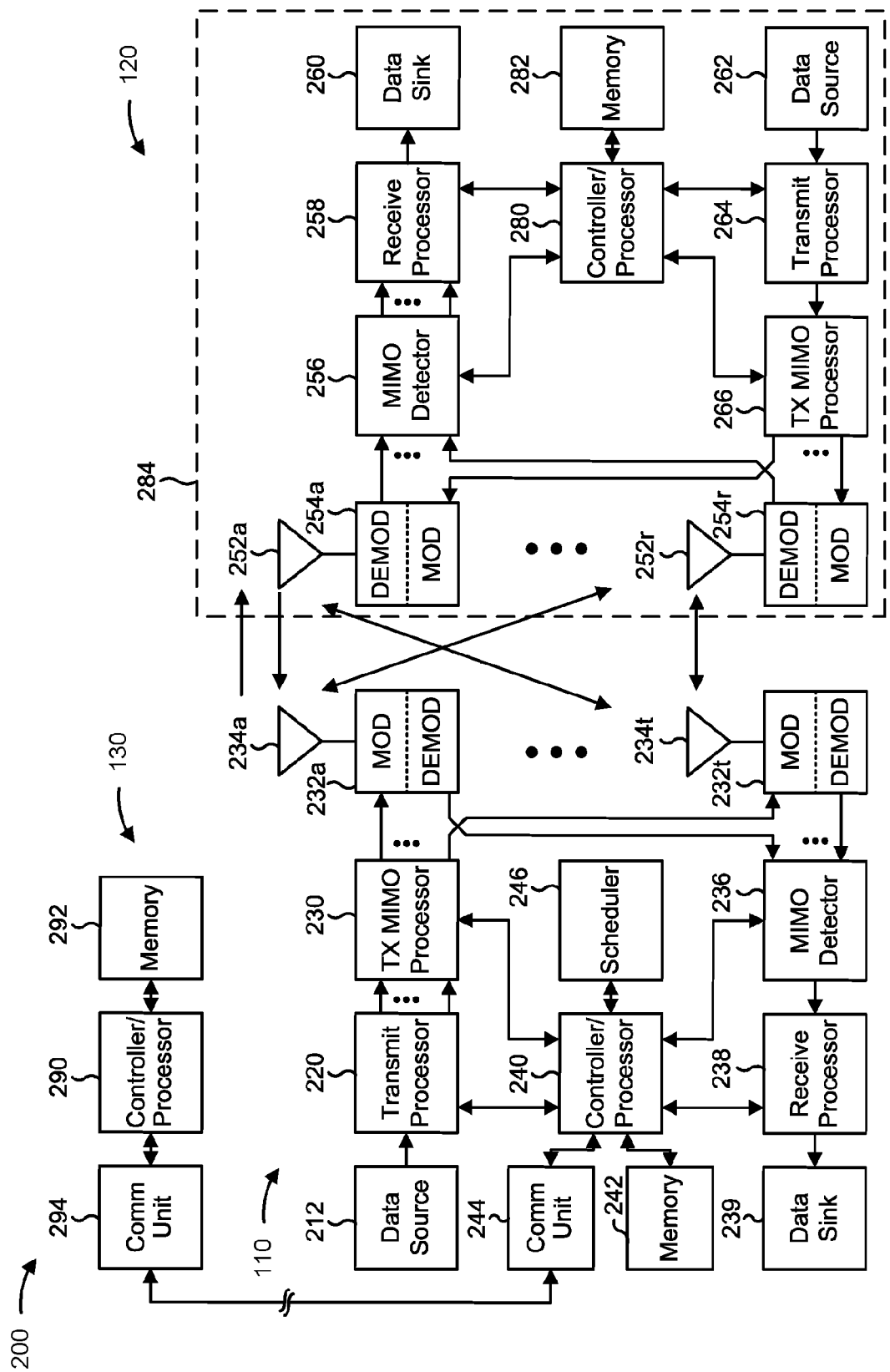
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234$a$ through 234$t$, such as T antennas (T≥1). The UE 120 may be equipped with a set of antennas 252$a$ through 252$r$, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232$a$ through 232$t$. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232$a$ through 232$t$ may transmit a set of downlink signals (e.g., T downlink signals) via a corresponding set of antennas 234 (e.g., T antennas), shown as antennas 234$a$ through 234$t$.

At the UE 120, a set of antennas 252 (shown as antennas 252$a$ through 252$r$) may receive the downlink signals from the base station 110 and/or other base stations 110 and may provide a set of received signals (e.g., R received signals) to a set of modems 254 (e.g., R modems), shown as modems 254$a$ through 254$r$. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-8).

The controller/processor 240 of the base station 110, the controller/processor 280 of the UE 120, and/or any other component(s) of FIG. 2 may perform one or more techniques associated with indicating transmission configuration indicator (TCI) states in downlink control information (DCI) format 1_2, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, a UE (e.g., the UE 120 and/or apparatus 700 of FIG. 7) may include means for receiving, from a base station (e.g., the base station 110 and/or apparatus 800 of FIG. 8), DCI in format 1_2 that includes an indicator with a first quantity of codepoints that is smaller than a second quantity of activated TCI states, the first quantity of codepoints relating to a subset of the second quantity of activated TCI states, the subset comprising a first quantity of activated TCI states; and/or means for applying a TCI state, from the subset, according to the indicator. The means for the UE to perform operations described herein may include, for example, one or more of antenna 252, modem 254, MIMO detector 256, receive processor 258, transmit processor 264, TX MIMO processor 266, controller/processor 280, or memory 282. Accordingly, as a technical effect, the UE and the corresponding base station experience increased reliability and/or quality of communications on a downlink channel (e.g., a PDSCH) because the UE applies a TCI state even when a size of the DCI is insufficient to distinguish among the second quantity of activated TCI states. Increased reliability and/or quality conserves power and processing resources (by allowing for reduced transmit power at the base station and by reducing chances of retransmissions because the UE is unable to decode data) and reduces network overhead (by reducing chances of retransmissions).

In some aspects, a base station (e.g., the base station 110 and/or apparatus 800 of FIG. 8) means for transmitting (e.g., to the UE 120 and/or apparatus 700 of FIG. 7) DCI in format 1_2 that includes an indicator with a first quantity of codepoints that is smaller than a second quantity of activated TCI states, the first quantity of codepoints relating to a subset of the second quantity of activated TCI states, the subset comprising a first quantity of activated TCI states; and/or means for applying a TCI state, from the subset, according to the indicator. The means for the base station to perform operations described herein may include, for example, one or more of transmit processor 220, TX MIMO processor 230, modem 232, antenna 234, MIMO detector 236, receive processor 238, controller/processor 240, memory 242, or scheduler 246. Accordingly, as a technical effect, the base station and the corresponding UE experience increased reliability and/or quality of communications on a downlink channel (e.g., a PDSCH) because the UE applies a TCI state even when a size of the DCI is insufficient to distinguish among the second quantity of activated TCI states. Increased reliability and/or quality conserves power and processing resources (by allowing for reduced transmit power at the base station and by reducing chances of retransmissions because the UE is unable to decode data) and reduces network overhead (by reducing chances of retransmissions).

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
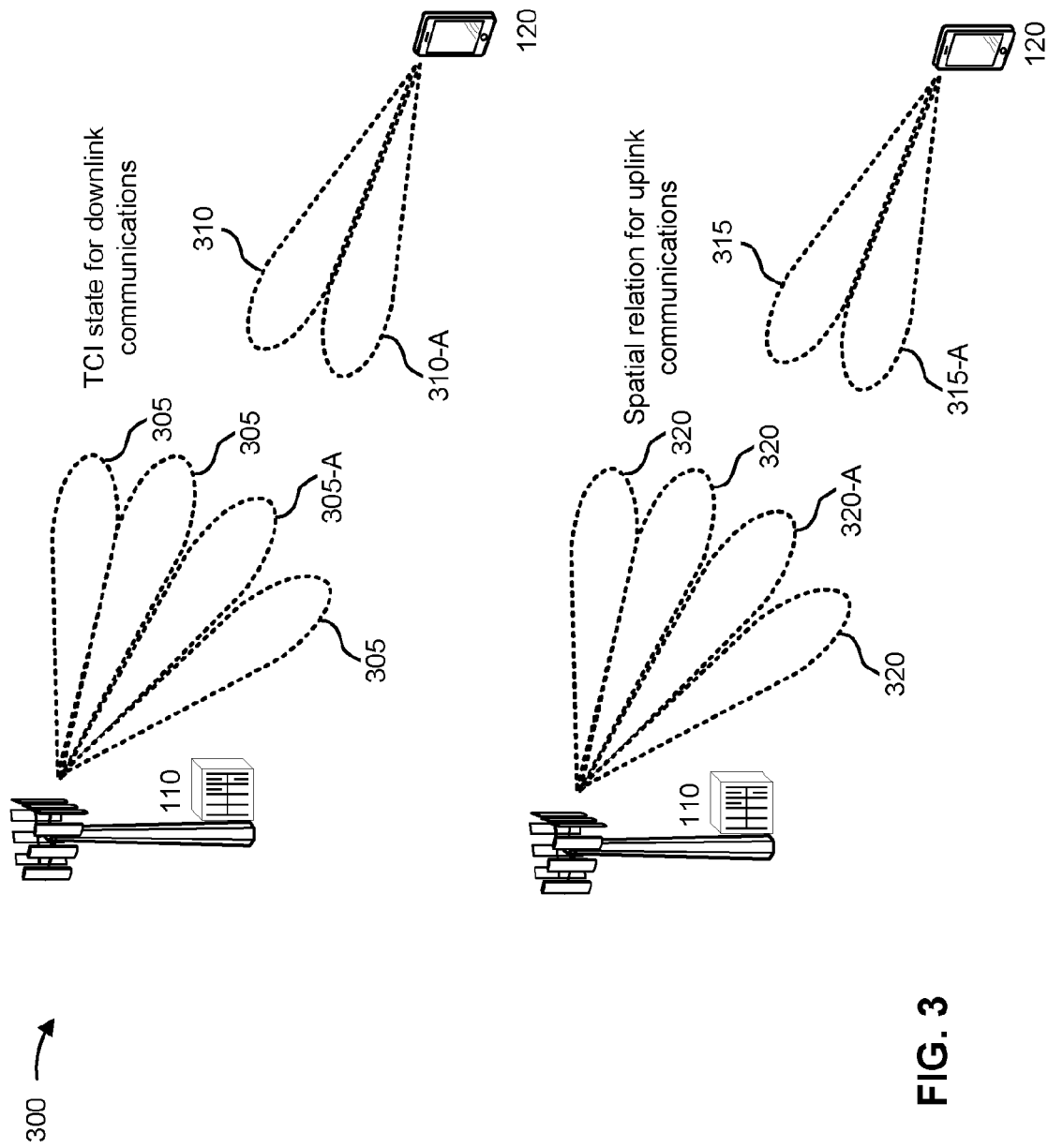
FIG. 3 is a diagram illustrating an example of using beams for communications between a base station and a UE, in accordance with the present disclosure.

FIG. 3 is a diagram illustrating an example 300 of using beams for communications between a base station and a UE, in accordance with the present disclosure. As shown in FIG. 3, a base station 110 and a UE 120 may communicate with one another.

The base station 110 may transmit to UEs 120 located within a coverage area of the base station 110. The base station 110 and the UE 120 may be configured for beamformed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 305.

The UE 120 may attempt to receive downlink transmissions via one or more UE receive beams 310, which may be configured using different beamforming parameters at receive circuitry of the UE 120. The UE 120 may identify a particular BS transmit beam 305, shown as BS transmit beam 305-A, and a particular UE receive beam 310, shown as UE receive beam 310-A, that provide relatively favorable performance (for example, that have a best channel quality of the different measured combinations of BS transmit beams 305 and UE receive beams 310). In some examples, the UE 120 may transmit an indication of which BS transmit beam 305 is identified by the UE 120 as a preferred BS transmit beam, which the base station 110 may select for transmissions to the UE 120. The UE 120 may thus attain and maintain a beam pair link (BPL) with the base station 110 for downlink communications (for example, a combination of the BS transmit beam 305-A and the UE receive beam 310-A), which may be further refined and maintained in accordance with one or more established beam refinement procedures.

A downlink beam, such as a BS transmit beam 305 or a UE receive beam 310, may be associated with a TCI state. A TCI state may indicate a directionality or a characteristic of the downlink beam, such as one or more quasi-co-location (QCL) properties of the downlink beam. A QCL property may include, for example, a Doppler shift, a Doppler spread, an average delay, a delay spread, or spatial receive parameters, among other examples. In some examples, each BS transmit beam 305 may be associated with a synchronization signal block (SSB), and the UE 120 may indicate a preferred BS transmit beam 305 by transmitting uplink transmissions in resources of the SSB that are associated with the preferred BS transmit beam 305. A particular SSB may have an associated TCI state (for example, for an antenna port or for beamforming). The base station 110 may, in some examples, indicate a downlink BS transmit beam 305 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 310 at the UE 120. Thus, the UE 120 may select a corresponding UE receive beam 310 from a set of BPLs based at least in part on the base station 110 indicating a BS transmit beam 305 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a physical downlink shared channel (PDSCH). The set of activated TCI states for downlink control channel communications may correspond to beams that the base station 110 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 315.

The base station 110 may receive uplink transmissions via one or more BS receive beams 320. The base station 110 may identify a particular UE transmit beam 315, shown as UE transmit beam 315-A, and a particular BS receive beam 320, shown as BS receive beam 320-A, that provide relatively favorable performance (for example, that have a best channel quality of the different measured combinations of UE transmit beams 315 and BS receive beams 320). In some examples, the base station 110 may transmit an indication of which UE transmit beam 315 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 315-A and the BS receive beam 320-A), which may be further refined and maintained in accordance with one or more established beam refinement procedures. An uplink beam, such as a UE transmit beam 315 or a BS receive beam 320, may be associated with a spatial relation. A spatial relation may indicate a directionality or a characteristic of the uplink beam, similar to one or more QCL properties, as described above.

As indicated above, FIG. 3 is provided as an example. Other examples may differ from what is described with respect to FIG. 3.

In some situations, a UE may receive (e.g., from a base station) a downlink transmission, such as data on PDSCH, using a TCI state. As described above, the TCI state may indicate one or more reference signals (e.g., a synchronization signal, such as an SSB; a CSI-RS; and/or another type of reference signal) with associated channel properties (e.g., a Doppler shift; a Doppler spread; an average delay; a delay spread; one or more spatial parameters, such as a spatial filter; and/or another type of property). The base station may use an RRC message (e.g., a PDSCH-Config message, as defined in 3GPP specifications, and/or another similar message) to configure a table of TCI states (e.g., up to 128 TCI states indicated by a tci-StatesToAddModList data structure, as defined in 3GPP specifications, and/or another similar data structure). The base station may further use a medium access control (MAC) layer control element (MAC-CE) to activate a portion of the TCI states in the table (e.g., up to 8 TCI states) for use on a downlink channel (e.g., a PDSCH and/or another downlink channel). The base station may schedule transmissions on the downlink channel using control information (e.g., DCI and/or another type of control information), and the control information may indicate one of those activated TCI states for the UE to use to receive data, scheduled by the control information, on the downlink channel.

DCI typically includes a field (e.g., a 'Transmission Configuration Indication' field, as defined in 3GPP specifications, and/or another similar field) with a fixed quantity of bits. For example, DCI format 1_1 in 3GPP specifications uses 3 bits for the field. Accordingly, the TCI field in DCI format 1_1 includes sufficient bits to distinguish a maximum amount of codepoints (e.g., 8 codepoints corresponding to the maximum of 8 activated TCI states). However, DCI format 1_2 in 3GPP specifications can include a TCI field of 0, 1, 2, or 3 bits. Accordingly, DCI format 1_2 may include a field with a number of codepoints that is less than the maximum amount of codepoints (e.g., 8 codepoints corresponding to the maximum of 8 activated TCI states). Accordingly, the UE may suffer lower quality and/or reliability on the downlink channel when the UE applies a different TCI state than the TCI state used by the base station to transmit on the downlink channel, which may degrade network performance.

Some techniques and apparatuses described herein allow a UE (e.g., UE 120) to map codepoints from a DCI format 1_2 indicator that has a quantity of codepoints (e.g., 2 codepoints for 1 bit or 4 codepoints for 2 bits) that is less than a maximum quantity of codepoints (e.g., corresponding to a maximum quantity of activated TCI states, such as 8). Accordingly, the UE 120 may apply a TCI state even when a size of the DCI is insufficient to distinguish among all activated TCI states. As a result, the UE 120 and a corresponding base station (e.g., base station 110) experience increased reliability and/or quality of communications on a downlink channel (e.g., a PDSCH). Increased reliability and/or quality conserves power and processing resources (by allowing for reduced transmit power at the base station 110 and by reducing chances of retransmissions because the UE 120 is unable to decode data) and reduces network overhead (by reducing chances of retransmissions).

Figure 4:
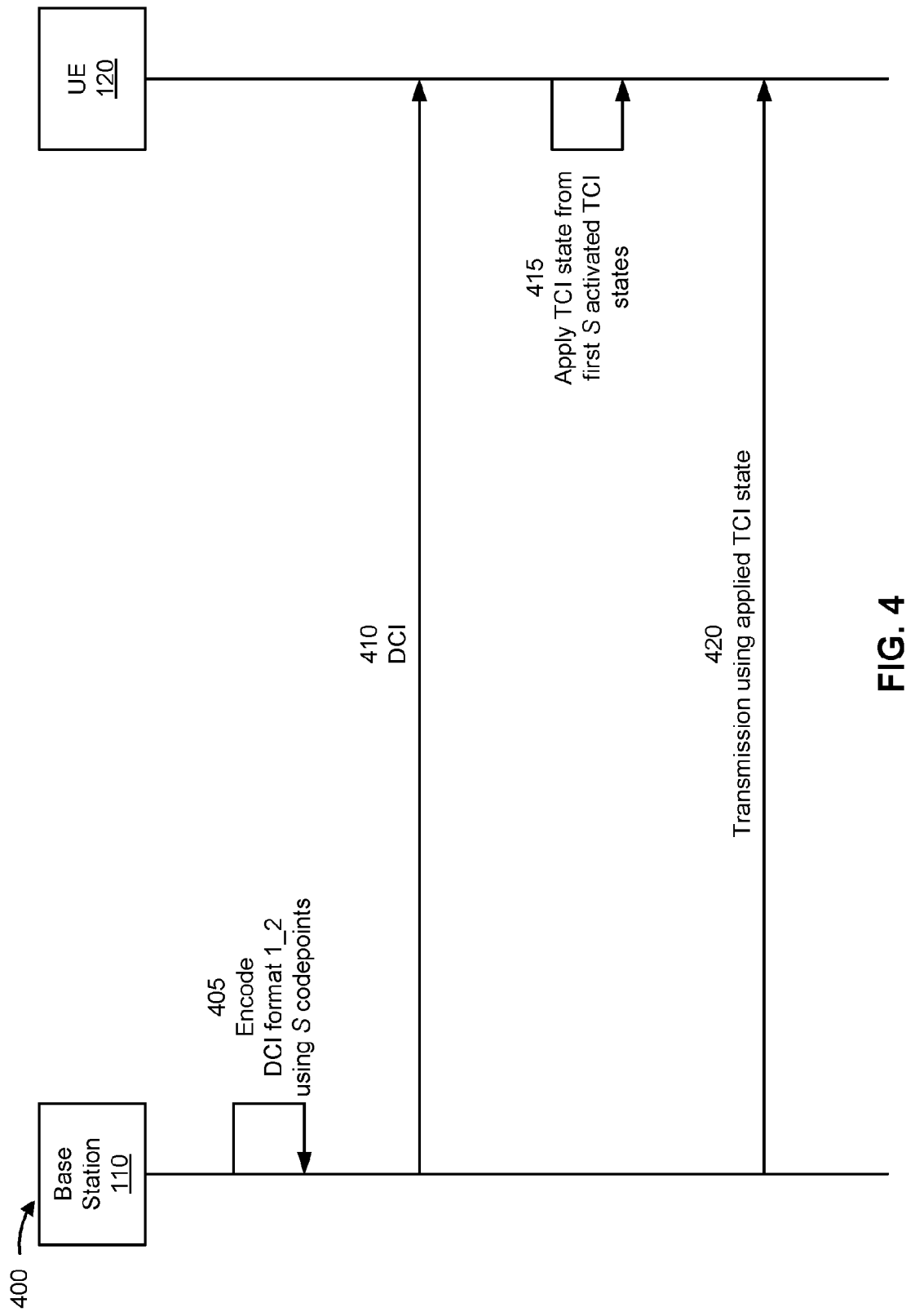
FIG. 4 is a diagram illustrating an example associated with indicating transmission configuration indicator (TCI) states in downlink control information (DCI) format 1_2, in accordance with the present disclosure.

FIG. 4 is a diagram illustrating an example 400 associated with determining size for DCI, in accordance with the present disclosure. As shown in FIG. 4, a base station 110 and a UE 120 may communicate with one another on a wireless network (e.g., wireless network 100 of FIG. 1). In some aspects, the base station 110 and the UE 120 may communicate on an uplink channel (e.g., a physical uplink control channel (PUCCH), a physical uplink shared channel (PUSCH), and/or another type of uplink channel) and a downlink channel (e.g., a PDCCH, a PDSCH, and/or another type of downlink channel).

As shown in connection with reference number 405, the base station 110 may encode DCI in format 1_2 to indicate a TCI state from a plurality of activated TCI states. For example, the base station 110 may transmit, and the UE 120 may receive, a table of TCI states (e.g., a tci-StatesToAddModList data structure included in an RRC message with a PDSCH-Config message, as defined in 3GPP specifications). Additionally, the base station 110 may transmit, and the UE 120 may receive, an activation of TCI states from the table in a MAC-CE. Additionally, or alternatively, the plurality of activated TCI states may include default TCI states that are programmed (and/or otherwise preconfigured) in the UE 120 and the base station 110 (e.g., according to 3GPP specifications and/or another standard).

In some aspects, the base station 110 may determine a quantity of activated TCI states associated with the UE 120. For example, as described above, the base station 110 may determine the quantity of activated TCI states based on the MAC-CE transmitted to the UE 120. Additionally, or alternatively, an indicator (e.g., the 'Transmission Configuration Indication' field, as defined in 3GPP specifications) included in the DCI may be associated with a quantity of codepoints (e.g., represented by S). The quantity of codepoints may be smaller than the quantity of activated TCI states such that the base station 110 (and the UE 120) may select from the first S TCI states out of the activated TCI states.

In some aspects, the first S TCI states may be based on corresponding indices associated with the activated TCI states. The indices may be included in the table of TCI states described above and/or may include default indices that are programmed (and/or otherwise preconfigured) in the UE 120 and the base station 110 (e.g., according to 3GPP specifications and/or another standard). For example, the first S TCI states may be based on a sequential order of the corresponding indices. Accordingly, in one example, first S TCI states may be determined as the first few activated TCI states, and the first few activated TCI states may be mapped sequentially to TCI codepoints indicated by the TCI field in DCI. For example, when the DCI is configured to have a TCI field of size 1 bit, and the activated TCI states have corresponding TCI state indices of 4, 5, 7, 10, 11, 13, 20, and 43, the first S TCI states that are mapped to the TCI codepoints of the TCI field in DCI may include those with corresponding indices of 4 and 5. Accordingly, if the TCI codepoint of the TCI field in DCI has a value of '0', the TCI state 4 is indicated, and if the TCI codepoint of the TCI field in DCI has a value of '1', the TCI state 5 is indicated. In another example, the activated TCI states may have corresponding indices of 0, 8, 12, 13, 33, 40, 101, and 107 such that the first S TCI states may include those with corresponding indices of the first four activated TCI states 0, 8, 12, and 13 or of the last four activated TCI states 33, 40, 101, and 107 (e.g., when the DCI includes a TCI field of size 2 bits for indicating a TCI state to use). By using the rules described above to select a subset of activated TCI states (the first S TCI states in this example), the UE 120 is able to apply a TCI state even when a size of the DCI is insufficient to distinguish among all activated TCI states. As a result, the UE 120 and the base station 110 experience increased reliability and/or quality of communications on a downlink channel (e.g., a PDSCH) because both the UE 120 and the base station 110 are applying a same TCI state while communicating.

In some aspects, the indices may be based on an RRC message that indicated a set of TCI states including the activated TCI states. For example, a table of TCI states (e.g., as described above) in the RRC message may indicate the corresponding indices for the set of TCI states. Accordingly, the TCI states may be activated using a MAC-CE indicating the corresponding indices of the TCI states to activate, and the first S TCI states may be based on a sequential order of codepoints according to the MAC-CE. The sequential order of the codepoints in the MAC-CE may correspond to the sequential order of the indices for the TCI states or may be different. For example, the control element may include a $0^{th}$ codepoint set to 10 (e.g., to indicate the TCI state with a corresponding index of 10 in the table), a $1^{st}$ codepoint set to 25 (e.g., to indicate the TCI state with a corresponding index of 25 in the table), and a $2^{nd}$ codepoint set to 11 (e.g., to indicate the TCI state with a corresponding index of 11 in the table). Accordingly, the first S TCI states may be based on a sequential order of those codepoints.

As shown in connection with reference number 410, the base station 110 may transmit, and the UE 120 may receive, the DCI. As shown in connection with reference number 415, the UE 120 may apply a TCI state according to the control information. In some aspects, as described above, the DCI may indicate the TCI state to use from the first S TCI states.

In some aspects, the activated TCI states may be based on a MAC-CE associated with a single TRP, antenna port, and/or antenna panel of the base station 110. For example, the MAC-CE may comprise a TCI States Activation/Deactivation for UE-specific PDSCH MAC CE as defined in 3GPP specifications and/or another similar control element. In some aspects, the base station 110 may have associated a CORESET pool identifier for a TRP, and have configured only a single CORESET pool identifier to the serving cell such that the MAC-CE includes the identifier (e.g., a CORESET Pool ID, as defined in 3GPP specifications, and/or another similar identifier). As an alternative, the base station 110 may not have a configured a CORESET pool identifier for the TRP (e.g., when the TRP uses only a single bandwidth part in a serving cell associated with the base station 110). In one example, if the TCI field of DCI format 1_2 has m bits (having S codepoints), the TCI codepoints of the TCI field in DCI format 1_2 may sequentially indicate the first or last $2^m$ activated TCI states in the TCI States activation/deactivation MAC CE for UE-specific PDSCH, and the UE 120 may ignore remaining activated TCI states when no CORESET pool identifier is configured or only a single CORESET pool identifier is configured in the serving cell.

In some aspects, the activated TCI states may be based on a MAC-CE associated with a CORESET pool identifier (e.g., a CORESET Pool ID) for one of a plurality of TRPs, antenna ports, and/or antenna panels of the base station 110. For example, the MAC-CE may comprise a TCI States Activation/Deactivation for UE-specific PDSCH MAC CE. Accordingly, the base station 110 may activate different pluralities of TCI states for the plurality of TRPs such that the MAC-CE is associated with one of the TRPs and activates a corresponding plurality of TCI states. The base station 110 and the UE 120 may apply the TCI state based on the corresponding plurality of TCI states. In one example, when two different CORESET Pool IDs (e.g., the CORESET Pool ID may be represented by X=0 or 1) are configured in the serving cell, and the TCI field of a DCI format 1_2 in a CORESET with a CORESET Pool ID of X has m bits (corresponding to S codepoints), the TCI codepoints of the TCI field in the DCI format 1_2 may sequentially indicate the first or last $2^m$ activated TCI states in the TCI states activation/deactivation MAC CE for UE-specific PDSCH associated with CORESET Pool ID of X, and the UE 120 may ignore remaining activated TCI states.

In some aspects, the activated TCI states may be based on a MAC-CE associated with a plurality of TRPs, antenna ports, and/or antenna panels of the base station 110. For example, the MAC-CE may comprise an Enhanced TCI States Activation/Deactivation MAC CE for UE-specific PDSCH, as defined in 3GPP specifications, and/or another similar control element. Accordingly, the base station 110 may activate pairs of (or three or more) TCI states for the plurality of TRPs such that the control element activates a plurality of pairs of (or three or more) TCI states. The base station 110 and the UE 120 may determine two (or three or more) TCI states to use based at least in part on the corresponding plurality of pairs of (or three or more) TCI states.

For example, the Enhanced TCI States Activation/Deactivation MAC CE for UE-specific PDSCH may activate a $0^{th}$ codepoint to activate a set of TCI states with corresponding indices 8 and 10, a $1^{st}$ codepoint to activate a set of TCI states with corresponding indices 6 and 25, and $2^{nd}$ codepoint to activate a set with a single TCI state having a corresponding index 11. In one example, if the TCI field of DCI format 1_2 has 1 bit (and thus S=2), TCI codepoints of the TCI field in DCI format 1_2 may sequentially indicate the first 2 activated codepoints in the MAC-CE, and the UE 120 may ignore the remaining codepoints. For example, if the first 2 activated codepoints in the MAC-CE are mapped to the TCI field in DCI, the TCI codepoint of the TCI field in DCI with a value of '0' indicates the $0^{th}$ codepoint, (e.g., the pair of TCI states with corresponding indices 8 and 10), and the TCI codepoint of the TCI field in DCI with a value of '1' indicates the $1^{st}$ codepoint (e.g., the pair of TCI states with corresponding indices 6 and 25).

In some aspects, the base station 110 may transmit, and the UE 120 may receive, an indication that the indicator (e.g., the 'Transmission Configuration Indication' field, as defined in 3GPP specifications) in the DCI will include one bit or two bits. For example, the base station 110 may transmit a tci-PresentDCI-1-2 data structure and/or another similar data structure in an RRC message, such as a message including a ControlResourceSet message and/or another similar message, as defined in 3GPP specifications. Accordingly, the base station 110 and the UE 120 may apply TCI states based on DCI format 1_2 as described above in response to the indication that the DCI will include one bit or two bits. For example, the base station 110 and the UE 120 apply a TCI state from a subset of activated TCI states (e.g., the first S TCI states as described above) in order to apply a TCI state even when a size of the DCI is insufficient to distinguish among all activated TCI states.

As shown in connection with reference number 420, the base station 110 may transmit, and the UE 120 may receive, data on a downlink channel (e.g., a PDSCH) using the applied TCI state. Transmission of the data may be scheduled using the DCI.

By using techniques as described in connection with FIG. 4, the UE 120 can map codepoints from a DCI format 1_2 indicator that has a quantity of codepoints (e.g., 2 codepoints for 1 bit or 4 codepoints for 2 bits) that is less than a maximum quantity of codepoints (e.g., corresponding to a maximum quantity of activated TCI states, such as 8). For example, the UE 120 uses a subset of activated TCI states (e.g., the first S TCI states as described above) in order to map each codepoint of the DCI to a corresponding TCI state within the subset on a one-to-one basis. Accordingly, the UE 120 may apply a TCI state even when a size of the DCI is insufficient to distinguish among all activated TCI states. As a result, the UE 120 and the base station 110 experience increased reliability and/or quality of communications on a downlink channel (e.g., a PDSCH). Increased reliability and/or quality conserves power and processing resources (by allowing for reduced transmit power at the base station 110 and by reducing chances of retransmissions because the UE 120 is unable to decode data) and reduces network overhead (by reducing chances of retransmissions).

As indicated above, FIG. 4 is provided as an example. Other examples may differ from what is described with respect to FIG. 4.

Figure 5:
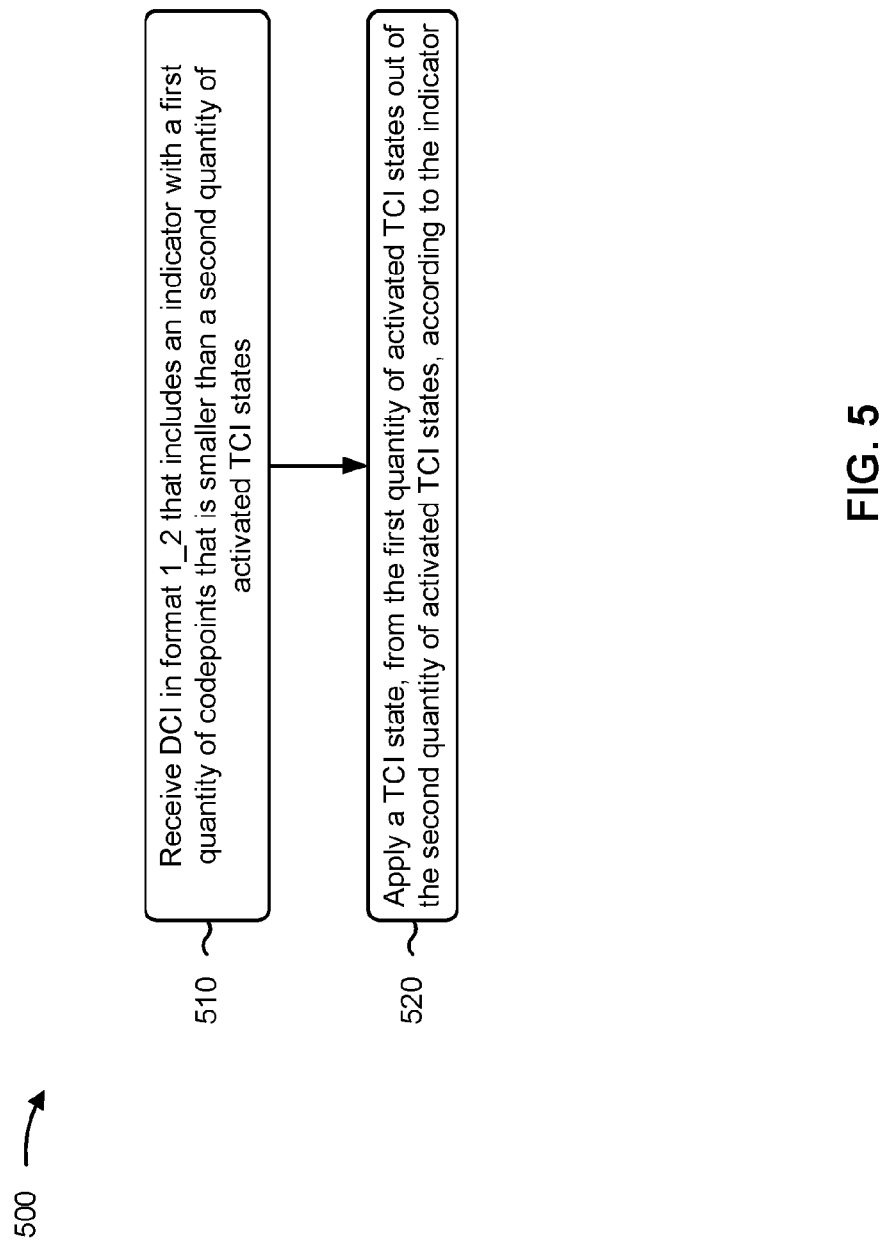
FIGS. 5 and 6 are diagrams illustrating example processes associated with indicating TCI states in DCI format 1_2, in accordance with the present disclosure.

FIG. 5 is a diagram illustrating an example process 500 performed, for example, by a UE, in accordance with the present disclosure. Example process 500 is an example where the UE (e.g., UE 120 and/or apparatus 700 of FIG. 7) performs operations associated with indicating TCI states in DCI format 1_2.

As shown in FIG. 5, in some aspects, process 500 may include receiving, from a base station, DCI in format 1_2 that includes an indicator with a first quantity of codepoints that is smaller than a second quantity of activated TCI states (block 510). For example, the UE (e.g., using reception component 702, depicted in FIG. 7) may receive, from a base station, DCI in format 1_2 that includes an indicator with a first quantity of codepoints that is smaller than a second quantity of activated TCI states, as described herein. In one example, the DCI includes a field, with the first quantity of codepoints, that is intended to indicate a TCI state from the second quantity of activated TCI states. The activated TCI states may have been previously indicated to the UE (e.g., via an RRC message and/or a MAC-CE) or may include a default set of activated TCI states programmed (and/or otherwise preconfigured) into the UE.

As further shown in FIG. 5, in some aspects, process 500 may include applying a TCI state, from the first quantity of activated TCI states out of the second quantity of activated TCI states, according to the indicator (block 520). For example, the UE (e.g., using TCI component 708, depicted in FIG. 7) may apply a TCI state, from the first quantity of activated TCI states out of the second quantity of activated TCI states, according to the indicator, as described herein. In one example, the first quantity of activated TCI states is a subset of the second quantity of activated TCI states. Accordingly, the UE is able to select a TCI state to apply even when the first quantity of codepoints is smaller than the second quantity of activated TCI states.

Process 500 may include additional aspects, such as any single aspect or any combination of aspects described below and/or in connection with one or more other processes described elsewhere herein.

In a first aspect, the first quantity of activated TCI states are based on corresponding codepoints associated with the activated TCI states. A technical effect of determining the first quantity of activated TCI states based on the corresponding codepoints is to allow the UE to map each codepoint of the DCI to a corresponding TCI state on a one-to-one basis.

In a second aspect, alone or in combination with the first aspect, the codepoints are based on a control element that activated the TCI states. A technical effect of using the control element is to reduce the second quantity of activated TCI states compared to using a larger set of TCI states, which conserves processing resources.

In a third aspect, alone or in combination with one or more of the first and second aspects, the first quantity of activated TCI states are based on a sequential order of the corresponding codepoints. A technical effect of using the sequential order is to conserve processing resources compared to other ordering schemes.

In a fourth aspect, alone or in combination with one or more of the first through third aspects, the first quantity of activated TCI states are based on corresponding indices associated with the activated TCI states. A technical effect of using the corresponding indices is to coordinate selection of the TCI state across the UE and the base station, without additional exchange of information, in order to conserve power, processing resources, and network resources.

In a fifth aspect, alone or in combination with one or more of the first through fourth aspects, the indices are based on an RRC message that indicated a set of TCI states that includes the activated TCI states.

In a sixth aspect, alone or in combination with one or more of the first through fifth aspects, the first quantity of activated TCI states are based on a sequential order of the corresponding indices. A technical effect of using the sequential order is to conserve processing resources compared to other ordering schemes.

In a seventh aspect, alone or in combination with one or more of the first through sixth aspects, the activated TCI states are activated by a control element, from the base station, associated with a single TRP of the base station.

In an eighth aspect, alone or in combination with one or more of the first through seventh aspects, the activated TCI states are activated by a control element, from the base station, associated with a CORESET pool identifier for one of a plurality of TRPs of the base station.

In a ninth aspect, alone or in combination with one or more of the first through eighth aspects, process 500 further includes receiving (e.g., using reception component 702), from the base station, an indication that the indicator in the DCI will include one bit or two bits, such that the TCI state is selected (e.g., using determination component 710, depicted in FIG. 7) from the first quantity of activated TCI states out of the second quantity of activated TCI states based on the indication. A technical effect of using the indication is to allow the UE to determine the first quantity of activated TCI states (which may be a subset of the second quantity of activated TCI states) in advance of receiving the DCI in order to reduce latency in applying the TCI state.

In a tenth aspect, alone or in combination with one or more of the first through ninth aspects, the indication is included in an RRC message.

In an eleventh aspect, alone or in combination with one or more of the first through tenth aspects, process 500 further includes receiving (e.g., using reception component 702), from the base station, data on a PDSCH scheduled using the DCI, where the data is received using the applied TCI state.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
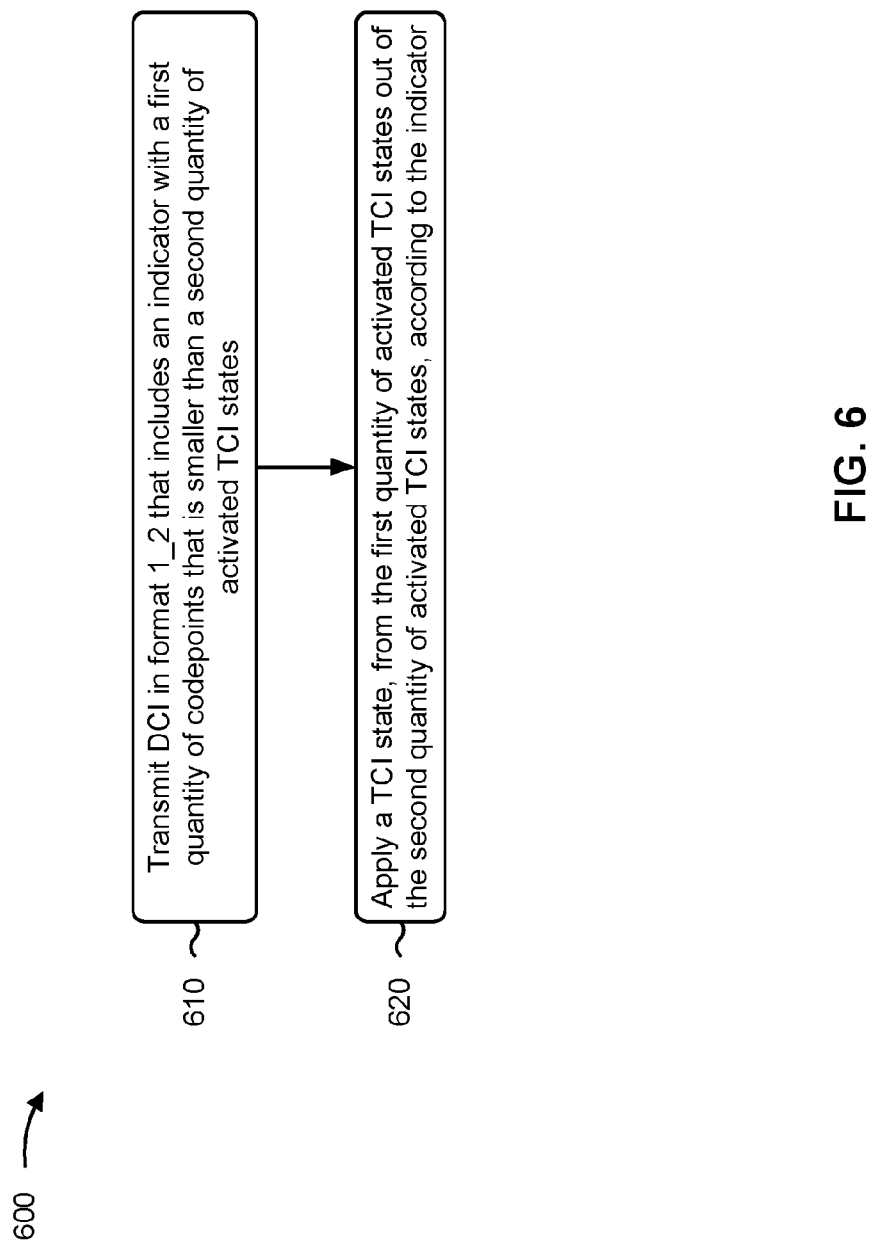

FIG. 6 is a diagram illustrating an example process 600 performed, for example, by a base station, in accordance with the present disclosure. Example process 600 is an example where the base station (e.g., base station 110 and/or apparatus 800 of FIG. 8) performs operations associated with indicating TCI states in DCI format 1_2.

As shown in FIG. 6, in some aspects, process 600 may include transmitting DCI in format 1_2 that includes an indicator with a first quantity of codepoints that is smaller than a second quantity of activated TCI states (block 610). For example, the base station (e.g., using transmission component 804, depicted in FIG. 8) may transmit DCI in format 1_2 that includes an indicator with a first quantity of codepoints that is smaller than a second quantity of activated TCI states, as described herein. In one example, the DCI includes a field, with the first quantity of codepoints, that is intended to indicate a TCI state from the second quantity of activated TCI states. The activated TCI states may have been previously indicated by the base station (e.g., via an RRC message and/or a MAC-CE) or may include a default set of activated TCI states programmed (and/or otherwise preconfigured) into the base station.

As further shown in FIG. 6, in some aspects, process 600 may include applying a TCI state, from the first quantity of activated TCI states, according to the indicator (block 620). For example, the base station (e.g., using TCI component 808, depicted in FIG. 8) may apply a TCI state, from the first quantity of activated TCI states, according to the indicator, as described herein. In one example, the first quantity of activated TCI states is a subset of the second quantity of activated TCI states. Accordingly, the base station is able to select a TCI state to use for transmission even when the first quantity of codepoints is smaller than the second quantity of activated TCI states.

Process 600 may include additional aspects, such as any single aspect or any combination of aspects described below and/or in connection with one or more other processes described elsewhere herein.

In a first aspect, the first quantity of activated TCI states are based on corresponding codepoints associated with the activated TCI states. A technical effect of determining the first quantity of activated TCI states based on the corresponding codepoints is to allow the base station to map each codepoint of the DCI to a corresponding TCI state on a one-to-one basis.

In a second aspect, alone or in combination with the first aspect, the codepoints are based on a control element that activated the TCI states. A technical effect of using the control element is to reduce the second quantity of activated TCI states compared to using a larger set of TCI states, which conserves processing resources.

In a third aspect, alone or in combination with one or more of the first and second aspects, the first quantity of activated TCI states are based on a sequential order of the corresponding codepoints. A technical effect of using the sequential order is to conserve processing resources compared to other ordering schemes.

In a fourth aspect, alone or in combination with one or more of the first through third aspects, the first quantity of activated TCI states are based on corresponding indices associated with the activated TCI states. A technical effect of using the corresponding indices is to coordinate selection of the TCI state across the UE and the base station, without additional exchange of information, in order to conserve power, processing resources, and network resources.

In a fifth aspect, alone or in combination with one or more of the first through fourth aspects, the indices are based on an RRC message (e.g., configured using RRC component 810, depicted in FIG. 8) that indicated a set of TCI states that includes the activated TCI states.

In a sixth aspect, alone or in combination with one or more of the first through fifth aspects, the first quantity of activated TCI states are based on a sequential order of the corresponding indices. A technical effect of using the sequential order is to conserve processing resources compared to other ordering schemes.

In a seventh aspect, alone or in combination with one or more of the first through sixth aspects, the activated TCI states are activated by a control element, from the base station, associated with a single TRP of the base station.

In an eighth aspect, alone or in combination with one or more of the first through seventh aspects, the activated TCI states are activated by a control element, from the base station, associated with a CORESET pool identifier for one of a plurality of TRPs of the base station.

In a ninth aspect, alone or in combination with one or more of the first through eighth aspects, process 600 further includes transmitting (e.g., using transmission component 804) an indication that the indicator in the DCI will include one bit or two bits, such that the TCI state is selected from the first quantity of activated TCI states out of the second quantity of activated TCI states based on the indication. A technical effect of using the indication is to allow the UE to determine the first quantity of activated TCI states (which may be a subset of the second quantity of activated TCI states) in advance of receiving the DCI in order to reduce latency in applying the TCI state.

In a tenth aspect, alone or in combination with one or more of the first through ninth aspects, the indication is included in an RRC message (e.g., configured using RRC component 810).

In an eleventh aspect, alone or in combination with one or more of the first through tenth aspects, process 600 further includes transmitting (e.g., using transmission component 804) data on a PDSCH scheduled using the DCI, where the data is transmitted using the applied TCI state.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
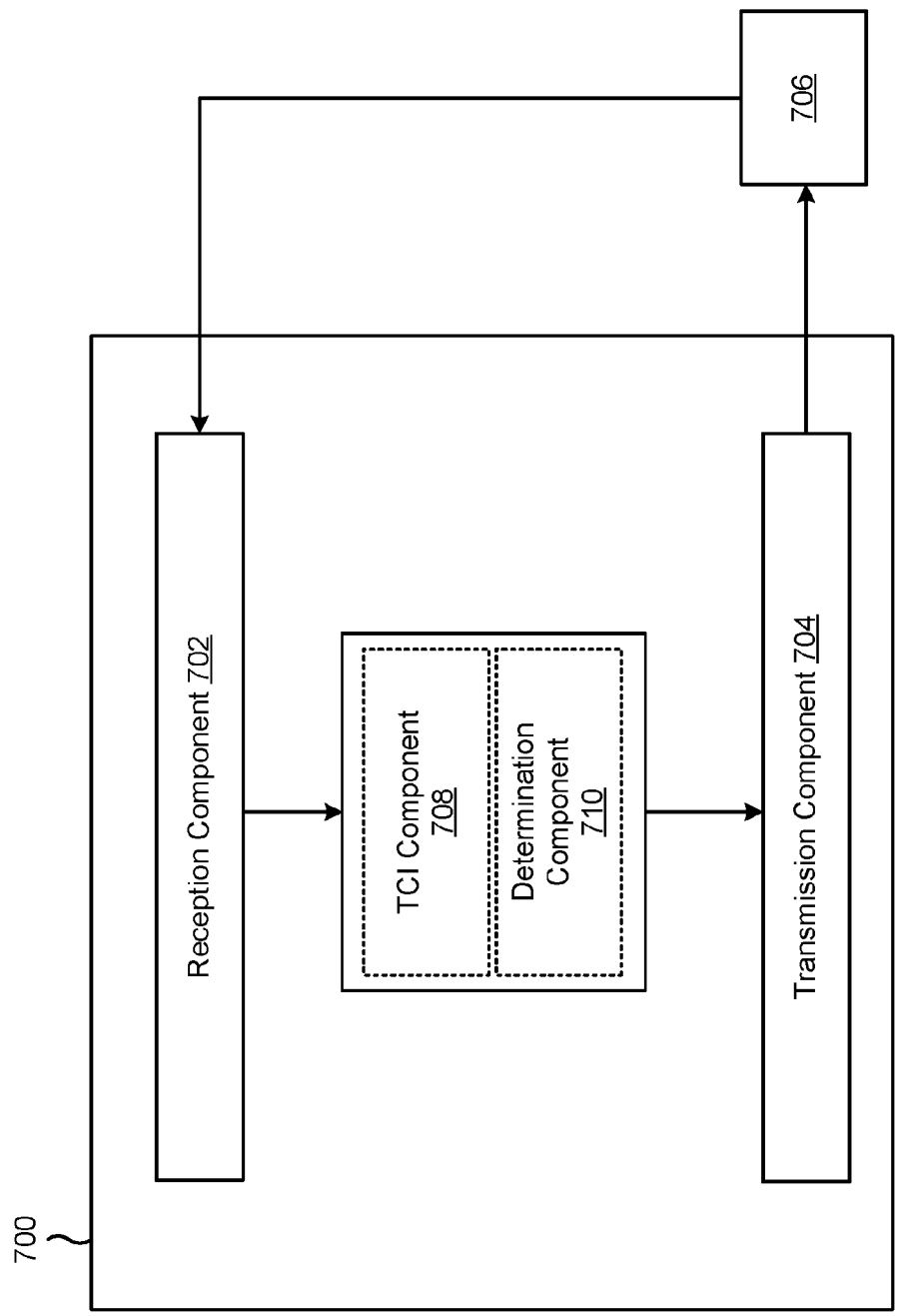
FIGS. 7 and 8 are diagrams of example apparatuses for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a TCI component 708 and/or a determination component 710, among other examples.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5, or a combination thereof. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

In some aspects, the reception component 702 may receive (e.g., from the apparatus 706, such as a base station) DCI in format 1_2 that includes an indicator with a first quantity of codepoints that is smaller than a second quantity of activated TCI states. The first quantity of codepoints relates to a subset of the second quantity of activated TCI states, and the subset includes a first quantity of activated TCI states. Accordingly, the TCI component 708 may apply a TCI state, from the subset, according to the indicator. The TCI component 708 may include one or more antennas, a modem, a demodulator, a MIMO detector, a receive processor, a modulator, a transmit MIMO processor, a transmit processor, a controller/processor, a memory, or a combination thereof, of the UE described in connection with FIG. 2.

In some aspects, the reception component 702 may receive (e.g., from the apparatus 706) an indication that the indicator in the DCI will include one bit or two bits. Accordingly, the determination component 710 may select the TCI state from the first quantity of activated TCI states, out of the second quantity of activated TCI states, based on the indication. The determination component 710 may include a MIMO detector, a receive processor, a transmit MIMO processor, a transmit processor, a controller/processor, a memory, or a combination thereof, of the UE described in connection with FIG. 2.

In some aspects, the reception component 702 may further receive (e.g., from the apparatus 706) data on a PDSCH scheduled using the DCI. The reception component 702 may receive the data using the TCI state applied by the TCI component 708.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
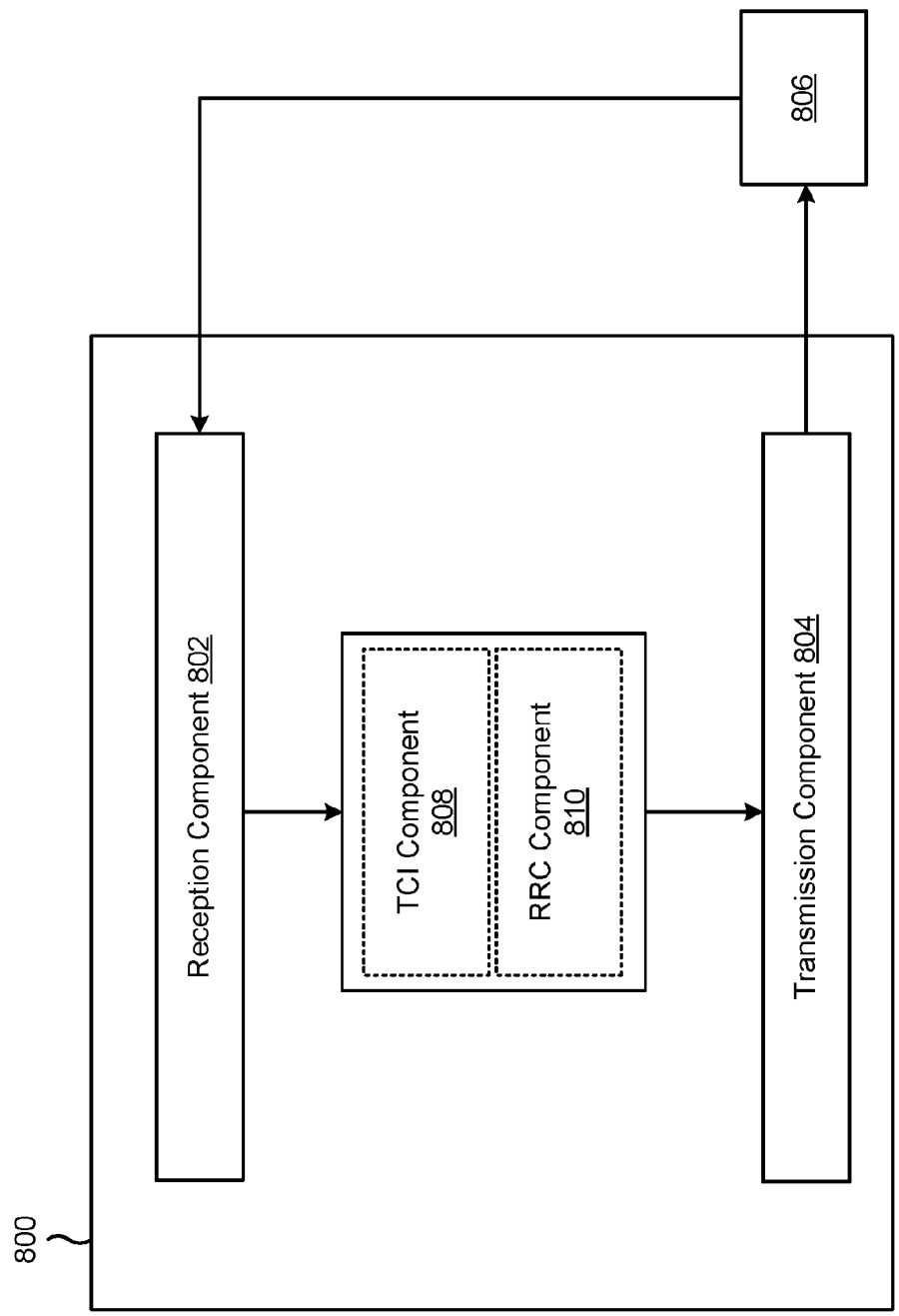

FIG. 8 is a diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a TCI component 808 and/or an RRC component 810, among other examples.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

In some aspects, the transmission component 804 may transmit (e.g., to the apparatus 806, such as a UE) DCI in format 1_2 that includes an indicator with a first quantity of codepoints that is smaller than a second quantity of activated TCI states. The first quantity of codepoints relates to a subset of the second quantity of activated TCI states, and the subset includes a first quantity of activated TCI states. Accordingly, the TCI component 808 may apply a TCI state, from the subset, according to the indicator. The TCI component 808 may include one or more antennas, a modem, a modulator, a transmit MIMO processor, a transmit processor, a demodulator, a MIMO detector, a receive processor, a controller/processor, a memory, or a combination thereof, of the base station described in connection with FIG. 2.

In some aspects, the transmission component 804 may transmit (e.g., to the apparatus 806) an indication that the indicator in the DCI will include one bit or two bits. For example, the RRC component 810 may include the indication in an RRC message. The RRC component 810 may include a transmit MIMO processor, a transmit processor, a controller/processor, a memory, or a combination thereof, of the base station described in connection with FIG. 2. Accordingly, the TCI component 808 may select the TCI state from the first quantity of activated TCI states, out of the second quantity of activated TCI states, based on the indication.

In some aspects, the transmission component 804 may further transmit (e.g., to the apparatus 806) data on a PDSCH scheduled using the DCI. The transmission component 804 may transmit the data using the TCI state applied by the TCI component 808.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving, from a base station, downlink control information (DCI) in format 1_2 that includes an indicator with a first quantity of codepoints that is smaller than a second quantity of activated transmission configuration indicator (TCI) states, the first quantity of codepoints relating to a subset of the second quantity of activated TCI states, the subset comprising a first quantity of activated TCI states; and applying a TCI state, from the subset, according to the indicator.

Aspect 2: The method of Aspect 1, wherein the first quantity of activated TCI states are based on corresponding codepoints associated with the activated TCI states.

Aspect 3: The method of Aspect 2, wherein the codepoints are based on a control element that activated the TCI states.

Aspect 4: The method of any of Aspects 2 through 3, wherein the first quantity of activated TCI states are based on a sequential order of the corresponding codepoints.

Aspect 5: The method of any of Aspects 1 through 4, wherein the first quantity of activated TCI states are based on corresponding indices associated with the activated TCI states.

Aspect 6: The method of Aspect 5, wherein the indices are based on a radio resource control (RRC) message that indicated a set of TCI states that includes the activated TCI states.

Aspect 7: The method of any of Aspects 5 through 6, wherein the first quantity of activated TCI states are based on a sequential order of the corresponding indices.

Aspect 8: The method of any of Aspects 1 through 7, wherein the activated TCI states are activated by a control element, from the base station, associated with a single transmit-receive point (TRP) of the base station.

Aspect 9: The method of any of Aspects 1 through 7, wherein the activated TCI states are activated by a control element, from the base station, associated with a control resource (CORESET) pool identifier for one of a plurality of transmit-receive points (TRPs) of the base station.

Aspect 10: The method of any of Aspects 1 through 9, further comprising: receiving, from the base station, an indication that the indicator in the DCI will include one bit or two bits, wherein the TCI state is selected from the first quantity of activated TCI states out of the second quantity of activated TCI states based on the indication.

Aspect 11: The method of Aspect 10, wherein the indication is included in a radio resource control (RRC) message.

Aspect 12: The method of any of Aspects 1 through 11, further comprising: receiving, from the base station, data on a physical downlink shared channel (PDSCH) scheduled using the DCI, wherein the data is received using the applied TCI state.

Aspect 13: A method of wireless communication performed by a base station, comprising: transmitting downlink control information (DCI) in format 1_2 that includes an indicator with a first quantity of codepoints that is smaller than a second quantity of activated transmission configuration indicator (TCI) states, the first quantity of codepoints relating to a subset of the second quantity of activated TCI states, the subset comprising a first quantity of activated TCI states; and applying a TCI state, from the subset, according to the indicator.

Aspect 14: The method of Aspect 13, wherein the first quantity of activated TCI states are based on corresponding codepoints associated with the activated TCI states.

Aspect 15: The method of Aspect 14, wherein the codepoints are based on a control element that activated the TCI states.

Aspect 16: The method of any of Aspects 14 through 15, wherein the first quantity of activated TCI states are based on a sequential order of the corresponding codepoints.

Aspect 17: The method of any of Aspects 13 through 16, wherein the first quantity of activated TCI states are based on corresponding indices associated with the activated TCI states.

Aspect 18: The method of Aspect 17, wherein the indices are based on a radio resource control (RRC) message that indicated a set of TCI states that includes the activated TCI states.

Aspect 19: The method of any of Aspects 17 through 18, wherein the first quantity of activated TCI states are based on a sequential order of the corresponding indices.

Aspect 20: The method of any of Aspects 13 through 19, wherein the activated TCI states are activated by a control element, from the base station, associated with a single transmit-receive point (TRP) of the base station.

Aspect 21: The method of any of Aspects 13 through 19, wherein the activated TCI states are activated by a control element, from the base station, associated with a control resource (CORESET) pool identifier for one of a plurality of transmit-receive points (TRPs) of the base station.

Aspect 22: The method of any of Aspects 13 through 21, further comprising: receiving, from the base station, an indication that the indicator in the DCI will include one bit or two bits, wherein the TCI state is selected from the first quantity of activated TCI states out of the second quantity of activated TCI states based on the indication.

Aspect 23: The method of Aspect 22, wherein the indication is included in a radio resource control (RRC) message.

Aspect 24: The method of any of Aspects 13 through 23, further comprising: receiving, from the base station, data on a physical downlink shared channel (PDSCH) scheduled using the DCI, wherein the data is received using the applied TCI state.

Aspect 25: An apparatus for wireless communication at a device, comprising a processor; memory coupled with the processor; and instructions stored in the memory and executable by the processor to cause the apparatus to perform the method of one or more of Aspects 1-12.

Aspect 26: A device for wireless communication, comprising a memory and one or more processors coupled to the memory, the one or more processors configured to perform the method of one or more of Aspects 1-12.

Aspect 27: An apparatus for wireless communication, comprising at least one means for performing the method of one or more of Aspects 1-12.

Aspect 28: A non-transitory computer-readable medium storing code for wireless communication, the code comprising instructions executable by a processor to perform the method of one or more of Aspects 1-12.

Aspect 29: A non-transitory computer-readable medium storing a set of instructions for wireless communication, the set of instructions comprising one or more instructions that, when executed by one or more processors of a device, cause the device to perform the method of one or more of Aspects 1-12.

Aspect 30: An apparatus for wireless communication at a device, comprising a processor; memory coupled with the processor; and instructions stored in the memory and executable by the processor to cause the apparatus to perform the method of one or more of Aspects 13-24.

Aspect 31: A device for wireless communication, comprising a memory and one or more processors coupled to the memory, the one or more processors configured to perform the method of one or more of Aspects 13-24.

Aspect 32: An apparatus for wireless communication, comprising at least one means for performing the method of one or more of Aspects 13-24.

Aspect 33: A non-transitory computer-readable medium storing code for wireless communication, the code comprising instructions executable by a processor to perform the method of one or more of Aspects 13-24.

Aspect 34: A non-transitory computer-readable medium storing a set of instructions for wireless communication, the set of instructions comprising one or more instructions that, when executed by one or more processors of a device, cause the device to perform the method of one or more of Aspects 13-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
     receive, from a network entity, downlink control information (DCI) in format 1_2 that includes an indicator associated with a first quantity of codepoints that is smaller than a second quantity of activated transmission configuration indicator (TCI) states,
     the DCI including a TCI field of m bits,
     m being an integer,
     the first quantity of the codepoints relating to a subset of the second quantity of the activated TCI states, and
     the subset comprising a first $2^m$ TCI states of the second quantity of the activated TCI states; and
     apply a TCI state, from the subset, according to the indicator.

2. The apparatus of claim 1, wherein a quantity of the first $2^m$ TCI states is a same quantity as the first quantity of the codepoints.

3. The apparatus of claim 2, wherein the codepoints are based on a control element that activated the activated TCI states.

4. The apparatus of claim 2, wherein the first $2^m$ TCI states are based on a sequential order of the corresponding codepoints.

5. The apparatus of claim 1, wherein the first $2^m$ TCI states are based on corresponding indices associated with the activated TCI states.

6. The apparatus of claim 5, wherein the corresponding indices are based on a radio resource control (RRC) message that indicated a set of TCI states that includes the activated TCI states.

7. The apparatus of claim 5, wherein the first $2^m$ TCI states are based on a sequential order of the corresponding indices.

8. The apparatus of claim 1, wherein the activated TCI states are activated by a control element associated with a single transmit-receive point (TRP) of the network entity.

9. The apparatus of claim 1, wherein the activated TCI states are activated by a control element associated with a control resource (CORESET) pool identifier for one of a plurality of transmit-receive points (TRPs) of the network entity.

10. The apparatus of claim 1, wherein the one or more processors are further configured to:
    receive, from the network entity, an indication that the indicator will include one bit or two bits,
      wherein the TCI state is selected from the first $2^m$ TCI states based on the indication.

11. The apparatus of claim 10, wherein the indication is included in a radio resource control (RRC) message.

12. The apparatus of claim 1, wherein the one or more processors are further configured to:
    receive, from the network entity, data on a physical downlink shared channel (PDSCH) scheduled using the DCI,
    wherein the data is received using the applied TCI state.

13. An apparatus for wireless communication at a network entity, comprising:
    a memory; and
    one or more processors, coupled to the memory, configured to:
      transmit downlink control information (DCI) in format 1_2 that includes an indicator associated with a first quantity of codepoints that is smaller than a second quantity of activated transmission configuration indicator (TCI) states,
      the DCI including a TCI field of m bits,
      m being an integer,
      the first quantity of the codepoints relating to a subset of the second quantity of the activated TCI states, and
      the subset comprising a first $2^m$ TCI states of the second quantity of the activated TCI states; and
      apply a TCI state, from the subset, according to the indicator.

14. The apparatus of claim 13, wherein a quantity of the first $2^m$ TCI states is a same quantity as the first quantity of the codepoints.

15. The apparatus of claim 14, wherein the codepoints are based on a control element that activated the activated TCI states.

16. The apparatus of claim 14, wherein the first $2^m$ TCI states are based on a sequential order of the codepoints.

17. The apparatus of claim 13, wherein the one or more processors are further configured to:

transmit an indication that the indicator will include one bit or two bits,
wherein the TCI state is selected from the first $2^m$ TCI states based on the indication.

18. The apparatus of claim 17, wherein the indication is included in a radio resource control (RRC) message.

19. A method of wireless communication performed by a user equipment (UE), comprising:
receiving, from a network entity, downlink control information (DCI) in format 1_2 that includes an indicator associated with a first quantity of codepoints that is smaller than a second quantity of activated transmission configuration indicator (TCI) states,
the DCI including a TCI field of m bits,
m being an integer,
the first quantity of the codepoints relating to a subset of the second quantity of the activated TCI states, and
the subset comprising a first $2^m$ TCI states of the second quantity of the activated TCI states; and
applying a TCI state, from the subset, according to the indicator.

20. The method of claim 19, wherein a quantity of the first $2^m$ TCI states is a same quantity as the first quantity of the codepoints.

21. The method of claim 20, wherein the codepoints are based on a control element that activated the activated TCI states.

22. The method of claim 20, wherein the first $2^m$ TCI states are based on a sequential order of the codepoints.

23. The method of claim 19, wherein the first $2^m$ TCI states are based on corresponding indices associated with the activated TCI states.

24. The method of claim 23, wherein the corresponding indices are based on a radio resource control (RRC) message that indicated a set of TCI states that includes the activated TCI states.

25. The method of claim 23, wherein the first $2^m$ TCI states are based on a sequential order of the corresponding indices.

26. The method of claim 19, wherein the activated TCI states are activated by a control element associated with a single transmit-receive point (TRP) of the network entity.

27. The method of claim 19, wherein the activated TCI states are activated by a control element associated with a control resource (CORESET) pool identifier for one of a plurality of transmit-receive points (TRPs) of the network entity.

28. The method of claim 19, further comprising:
receiving, from the network entity, an indication that the indicator will include one bit or two bits,
wherein the TCI state is selected from the first $2^m$ TCI states based on the indication.

29. The method of claim 28, wherein the indication is included in a radio resource control (RRC) message.

30. A method of wireless communication performed by a base station, comprising:
transmitting downlink control information (DCI) in format 1_2 that includes an indicator associated with a first quantity of codepoints that is smaller than a second quantity of activated transmission configuration indicator (TCI) states,
the DCI including a TCI field of m bits,
m being an integer,
the first quantity of the codepoints relating to a subset of the second quantity of the activated TCI states, and
the subset comprising a first $2^m$ TCI states of the second quantity of activated TCI states; and
applying a TCI state, from the subset, according to the indicator.

* * * * *